G. SEIL.
HOLD-BACK FOR THILLS.

No. 182,134. Patented Sept. 12, 1876.

WITNESSES:
E. Wolff.
John Goethals

INVENTOR:
G. Seil
BY
ATTORNEYS.

UNITED STATES PATENT OFFICE.

GEORGE SEIL, OF EAST RANDOLPH, NEW YORK.

IMPROVEMENT IN HOLDBACKS FOR THILLS.

Specification forming part of Letters Patent No. 182,134, dated September 12, 1876; application filed July 11, 1876.

*To all whom it may concern:*

Figure 1:
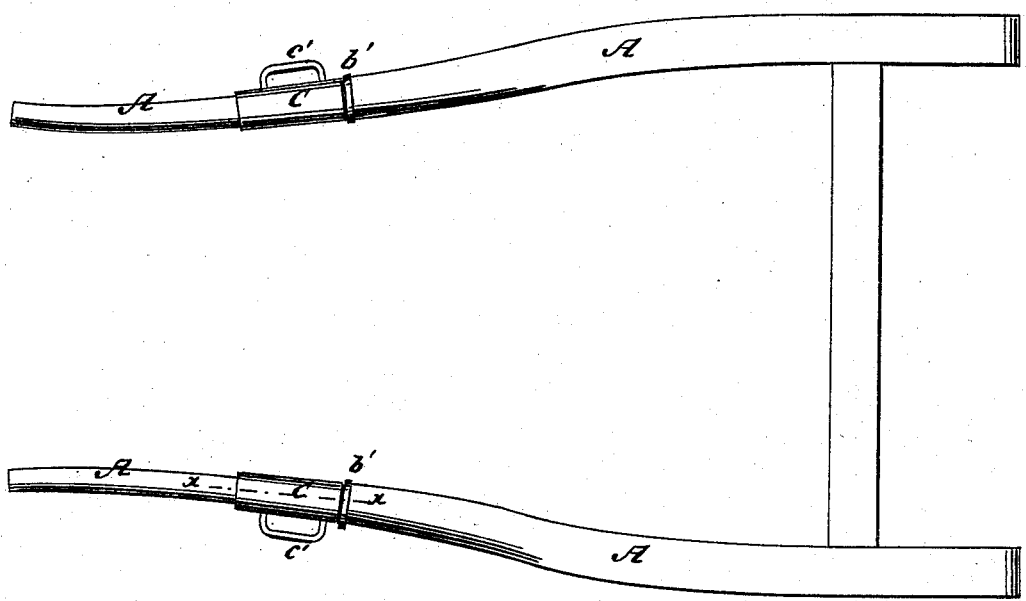
Figure 2:
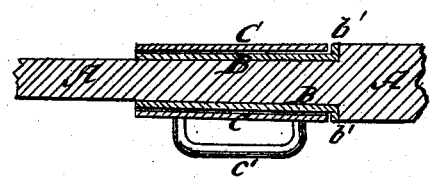

Be it known that I, GEORGE SEIL, of East Randolph, Cattaraugus county, New York, have invented a new and Improved Holdback for Thills, of which the following is a specification:

Figure 1 represents a pair of thills to which my improved holdback has been attached; and Fig. 2 is a detail longitudinal section of one of the thills, taken through line $x\ x$, Fig. 1.

Similar letters of reference indicate corresponding parts.

The object of this invention is to furnish an improved device for connecting the holdback-straps of a harness with the thills, which shall be so constructed as to allow the said holdback-straps to disengage themselves from the thills should the drawing device become detached or break.

The invention consists in the stationary flanged tubes and the sliding tubes, provided with keepers, in combination with each other and with the thills, as hereinafter fully described.

A represents the thills. B is a short tube slipped upon each of the thills A from its forward end, and the rear end of which has a flange, $b'$, formed upon it, and rests against a shoulder formed upon the said thills. C is a short tube, of such a size as to fit loosely upon the tube B, and to be easily slipped on and off the end of the thill A. The rear end of the tube C rests against the flange $b'$ of the tube B, and to said tube C is attached a keeper, $c'$, for securing the holdback-strap to said tube C. With this construction, should the drawing device become detached, the tubes C will readily slip off the forward ends of the thills, and the horse will be entirely disengaged from the vehicle.

I am aware that it is not broadly new to construct a holdback in such a manner that it will permit the disengagement of the horse from the shafts in case of accident.

Having thus described my invention, I claim as new and desire to secure by Letters Patent—

The combination of the fixed flanged tube B and the sliding tube C, encircling said fixed tube, and having the keeper $c$, with the shafts A, all constructed and relatively arranged, as shown, to operate in the manner set forth.

GEORGE SEIL.

Witnesses:
JOHNSON V. GOODWILL,
FRANK WALKER STEVENS.